US012233354B2

(12) United States Patent
Nomen Calvet et al.

(10) Patent No.: US 12,233,354 B2
(45) Date of Patent: Feb. 25, 2025

(54) DEVICE FOR DESALINATION BY LIQUID WATER JET COMPRESSION

(71) Applicants:WGA WATER GLOBAL ACCESS, SL, Sispony (AD); Juan Eusebio Nomen Calvet, L'Aldosa (AD); Dan Alexandru Hanganu, Barcelona (ES)

(72) Inventors: Juan Eusebio Nomen Calvet, L'Aldosa (AD); Dan Alexandru Hanganu, Barcelona (ES)

(73) Assignees: WGA WATER GLOBAL ACCESS, SL, Sispony (AD); Juan Nomen Calvet, L'Aldosa (AD); Dan Hanganu, Barcelona (ES)

( * ) Notice: Subject to any disclaimer, the term of this patent is extended or adjusted under 35 U.S.C. 154(b) by 226 days.

(21) Appl. No.: 17/917,798

(22) PCT Filed: Apr. 8, 2021

(86) PCT No.: PCT/ES2021/070233
§ 371 (c)(1),
(2) Date: Oct. 7, 2022

(87) PCT Pub. No.: WO2021/205052
PCT Pub. Date: Oct. 14, 2021

(65) Prior Publication Data
US 2023/0134288 A1    May 4, 2023

(30) Foreign Application Priority Data

Apr. 8, 2020   (ES) ............................ ES202030617U

(51) Int. Cl.
*C02F 1/04*    (2023.01)
*B01D 1/00*    (2006.01)
(Continued)

(52) U.S. Cl.
CPC .............. *B01D 1/28* (2013.01); *B01D 1/0058* (2013.01); *B01D 5/0039* (2013.01); *C02F 1/041* (2013.01);
(Continued)

(58) Field of Classification Search
CPC .............. B01D 1/28–2896; B01D 1/06; C02F 1/04–043; C02F 1/16
See application file for complete search history.

(56) References Cited

U.S. PATENT DOCUMENTS

| 11,209,217 B2 | 12/2021 | Nomen Calvet et al. |
| 2003/0173204 A1 | 9/2003 | Sanchez Gomez |
| 2012/0247689 A1* | 10/2012 | Caux ........................ B01D 1/14 159/24.3 |

FOREIGN PATENT DOCUMENTS

RU    2234354 C1    8/2004

OTHER PUBLICATIONS

International Search report for PCT/ES2021/070233, prepared by the Spanish Patent Office, mailing date May 14, 2021,7 pages.

* cited by examiner

*Primary Examiner* — Renee Robinson
(74) *Attorney, Agent, or Firm* — Brooks Kushman P.C.

(57) ABSTRACT

The invention relates to a system and device for desalination by liquid water jet compression, which is a phase-change desalination with a high-efficiency latent heat exchanger in which the pressure of the primary saturated vapor is increased until obtaining the secondary saturated vapor by injecting translational and rotational kinetic energy via pressurized water jets, so as to leave an unobstructed path through which the vapor flows at high speed in order to achieve a high flow rate and high efficiency.

6 Claims, 3 Drawing Sheets

(51) Int. Cl.
  *B01D 1/28* (2006.01)
  *B01D 5/00* (2006.01)
  *C02F 1/16* (2023.01)
  *F28D 20/02* (2006.01)
  *C02F 103/08* (2006.01)
(52) U.S. Cl.
  CPC ............... *C02F 1/048* (2013.01); *C02F 1/16* (2013.01); *F28D 20/02* (2013.01); *C02F 2103/08* (2013.01)

DEVICE FOR DESALINATION BY LIQUID WATER JET COMPRESSION

CROSS-REFERENCE TO RELATED APPLICATION

This application is the U.S. national phase of PCT Application No. PCT/ES2021/070233 filed on Apr. 8, 2021, which claims priority to ES Patent Application No. U202030617 filed on Apr. 8, 2020, the disclosures of which are incorporated in their entirety by reference herein.

OBJECT OF THE INVENTION

The present invention relates to a device for desalination by liquid water jet compression.

BACKGROUND OF THE INVENTION

It is known in the state of the art that the density of liquid water at 30° C. is 995,710 g/m$^3$ while that of water vapor is only 29.5 g/m$^3$. Therefore, the evaporation process is explosive with a volume expansion that depends on the temperature of the water and that at 30° C. is more than 33,000 times. The volumetric expansion in an evaporation process occurs at a speed that is limited by the sonic velocity.

The condensation of water vapor is the implosive process symmetrical to evaporation, with a volume contraction of more than 33,000 times that, under ideal conditions, propagates at the sonic velocity.

Inside an evaporator-condenser device under vacuum conditions, that is, in the absence of incondensable gases that would obstruct the flow of vapor, the water vapor flows from the evaporating surface to the condensing surface at high speed, being limited by the sonic velocity in water vapor at its temperature. In Multi-Effect Distillation (MED) desalination devices, the water vapor generated on the evaporating surface of the tubes of one effect flows to the condensing surface of the next effect.

For a flow of water vapor to occur between an evaporating surface and a condensing surface, a temperature gradient must exist.

In phase-change desalination devices, this temperature gradient between the evaporating and condensing surfaces is achieved in two manners: by supplying external heat and by supplying mechanical energy that compresses primary vapor into secondary vapor.

The external supply of heat makes it possible to control the temperature of the water to be evaporated and the temperature of the vapor to be condensed, as occurs in MED devices, in Multi-Stage Flash (MSF) desalination devices and in devices for desalination by vapor thermal compression. The problem with devices based on external heat input is the high specific energy consumption.

The supply of work, of mechanical energy, makes it possible to compress the primary vapor resulting from the evaporation and to obtain a secondary vapor of higher pressure and temperature that condenses on the condensing surface of the tube or chamber on whose evaporating surface the primary vapor is generated as occurs in desalination devices by mechanical vapor compression or recompression, MVC or MVR, in devices raising the pressure of primary vapor through fans or blowers, as described in patent PCTES2018070782, and in devices where injection of pressurized water through an injector that covers the entire section of an accelerator tube through which the liquid water jet entrains the primary water vapor to give it speed, which is transformed into higher pressure, as described in patent RU2234354 C1.

The problem with devices with mechanical input that compresses the primary vapor is that they impose a mechanical obstacle to the flow of vapor that flows from its origin in the explosion of the evaporator to its disappearance by implosion in the condenser, so that the speed of the flow remains limited by the speed of the impeller, compressor, fan, blower or liquid jet, causing inefficiencies due to the reduction in flow resulting from the axial interposition of the physical element that supplies energy to the vapor flow, which becomes an obstacle in the path that reduces the speed of the vapor flow and, with it, the flow rate.

SUMMARY OF THE INVENTION

The present invention seeks to solve one or more of the problems and challenges set forth above by means of a device for desalination by liquid water jet compression, as defined in the claims.

The device for desalination by liquid water jet compression is a phase-change desalination device, with at least one high-efficiency latent heat exchanger in which primary vapor evaporation and secondary vapor condensation take place. In a system for desalination by liquid water jet compression, energy is supplied to the vapor flow that flows from the explosion on the evaporating surface to the implosion on the condensing surface by means of at least one liquid water jet, to increase the pressure and temperature of the primary saturated vapor and obtain a secondary saturated vapor.

The energy supplied to the desalination plant by liquid water jet compression is translational kinetic energy, rotational kinetic energy or a combination of both, with the condition of leaving at least one path free of barriers in which there are no obstacles that may slow down the speed of the vapor flow. Barrier-free path to vapor flow can be achieved with a stream tube without physical obstacles and can be achieved with an expansion chamber in which the vapor flow section is increased so that the speed of the vapor flow decreases, and, inside this expansion chamber and while the vapor flow is moving at a lower speed, at least one liquid water jet is applied to it, the drops of which having a speed greater than that of the vapor flow.

In a device for desalination by liquid water jet compression, a translational kinetic energy supply to at least one vapor flow is carried out by supplying at least one pressurized liquid water jet in the direction of the vapor flow that can be accompanied by one, or more than one, vapor jet leaving a side inlet or an inlet in the center of the liquid water jet, free from physical obstacles, through which at least one vapor flow can flow unhindered from the evaporating surface to the condensing surface. In a device for desalination by liquid water jet compression, a translational kinetic energy contribution to at least one vapor flow is also carried out by supplying at least one pressurized liquid water jet in the direction of the vapor flow that can be accompanied by one, or more than one, vapor jet within an expansion chamber in which the flow of vapor has slowed down and the speed of the droplets of the at least one liquid water jet is greater than the speed of the water vapor flow.

In a device for desalination by liquid water jet compression, rotational kinetic energy is supplied to at least one vapor flow by supplying at least one pressurized liquid water jet, which may be accompanied by at least one jet of vapor, the direction of this jet being tangential to the current tube of the vapor flow that flows from the evaporating surface to the condensing surface, so that this, at least one, tangential jet supplies rotation to the vapor flow and an increase in the total kinetic energy of the primary saturated vapor jet is obtained that is transformed into potential energy of the secondary saturated vapor, thus obtaining the necessary increase in pressure and temperature and this process is carried out inside an expansion chamber in which the flow of vapor has slowed down so that the droplets of the liquid water jet do not act as a brake on the vapor flow or in another space without physical barriers that restrict the vapor flow from the evaporating to the condensing surface. The jets supplying rotational kinetic energy must keep the center of the vapor stream tube free of obstacles in the form of liquid water, so that the vapor can flow at the maximum speed physically possible, and with the highest possible flow rate, all the way between the evaporating and condensing zones upon finding at least one path or space free of obstacles.

The translational kinetic energy input can be used for the start-up function of the system; for the function of maintaining the optimum temperature gradient between the evaporating and condensing surfaces of the device for desalination by liquid water jet compression; and for supplying operational translational kinetic energy in a configuration with a vapor flow expansion chamber. The input of rotational kinetic energy can be used to achieve higher flow rates and efficiency of the device for desalination by liquid water jet compression. The system for desalination by liquid water jet compression is based on the supply of translational and rotational kinetic energy or both with at least one unobstructed vapor flow path, combined with a high-efficiency latent heat exchanger that allows high transfer coefficients and low temperature gradients between the secondary vapor and the aqueous solution to be desalinated and allows desalination or purification of aqueous solutions with a specific energy consumption close to the theoretical minimum, and permits desalination or purification of water at room temperature, without heat input.

Desalination at room temperature allows the device for desalination by liquid water jet compression to reduce mineral crystallization and precipitation phenomena. The device for desalination by liquid water jet compression works under vacuum conditions that reduce the proliferation of biofilms inside. Consequently, the device for desalination by liquid water jet compression has low pretreatment needs for the liquid to be desalinized, which is why the content of chemical products in the resulting brine is drastically reduced, compared to current membrane or phase-change desalination techniques.

The little investment required in the pretreatment of the solution to be desalinated permits to work with a wide range of recovery ratios. The user can decide the range of recovery to use according to their environmental and economic priorities.

Low recovery ratios, that is, the extraction of a small percentage of fresh water from the seawater collected, allow the reduction of the specific energy cost by working with lower elevations of the boiling point and allows a low increase in the salinity of the brine that, added to a low content of chemical products, drastically reduces the environmental impact of the brine returned to the environment. This reduction in brine toxicity and the low specific energy consumption open the door to truly green, sustainable global desalination.

BRIEF DESCRIPTION OF THE FIGURES

A more detailed explanation of the invention is given in the following description based on the attached figures.

DETAILED DESCRIPTION OF THE INVENTION

The liquid water jet compression applied to the desalination of seawater or to the purification of another aqueous solution is a phase-change desalination system without external heat input. It is based on providing translational kinetic energy, rotational kinetic energy or both to the primary saturated vapor flow that flows from the evaporating surface to the condensing surface to increase its pressure and temperature and generate a secondary saturated vapor, without creating barriers in the vapor flow, barriers that reduce the speed and rate of the vapor flow.

To achieve greater efficiency by working with low temperature gradients between the evaporating and condensing surfaces, instead of using the current thin water layer latent heat exchangers that have a latent heat exchange coefficient of around 2,000 $W/m^2K$, the device for desalination by liquid water jet compression may comprise at least one high-efficiency latent heat exchanger with tubes or chambers 1 and shell 2 with a latent heat exchange coefficient above 10,000 $W/m^2K$.

Figure 1:
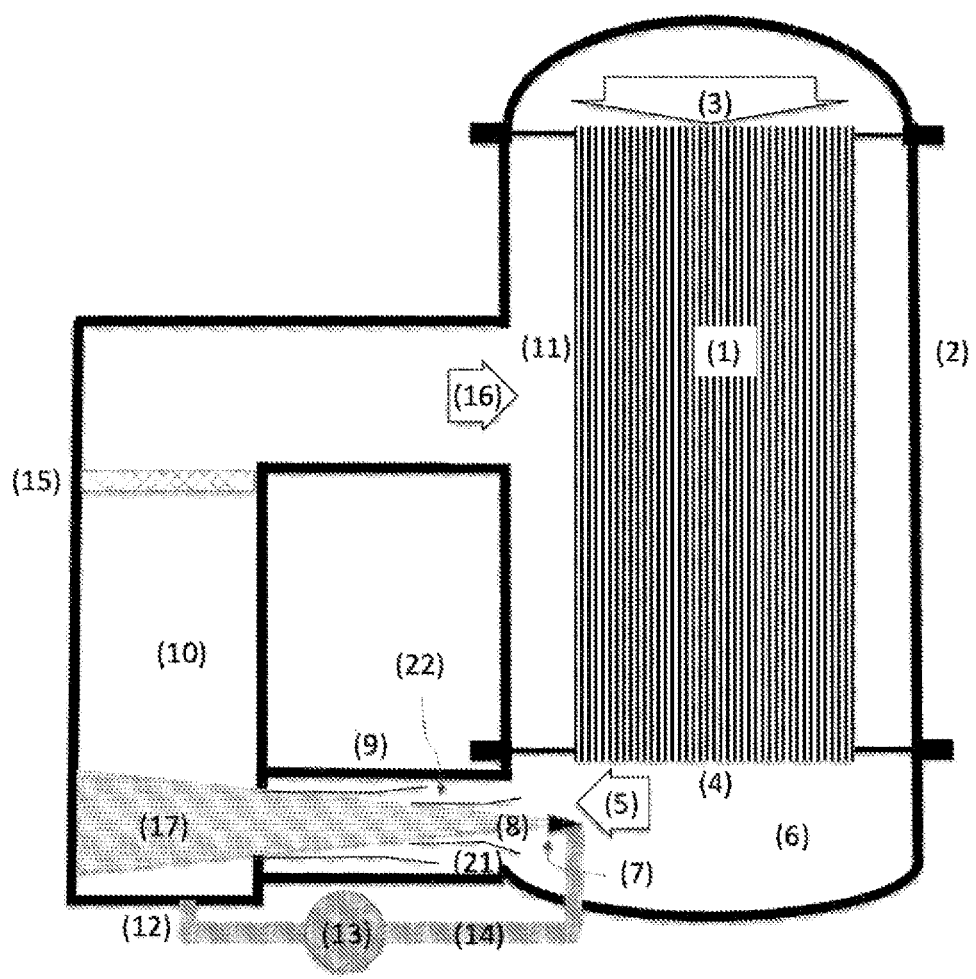
FIG. 1 shows a diagram of a configuration of a device for desalination by liquid water jet compression with translational kinetic energy input and side entry of vapor.

As illustrated in FIG. 1, the exchanger includes the tubes or chambers 1 of the latent heat exchanger in a vertical position, with a feeding system for the aqueous solution to be desalinated 3 that introduces the liquid to be desalinated through the evaporating inner surface of the tubes or chambers 1 and the brine resulting from the evaporation process and the primary water vapor 5 evaporated on the evaporating inner surface of the tubes or chambers 1 exits to the collection chamber 6 through the lower inner part 4 of the tubes or chambers.

Figure 2:
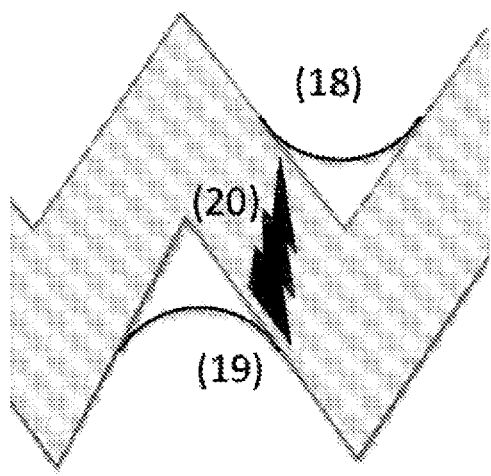
FIG. 2 shows a diagram of the wall of a high-efficiency latent heat exchanger.

Referring now to FIG. 2, a diagram of a wall of a tube or chamber 1 of the high-efficiency latent heat exchanger having the following characteristics is shown: the seawater to be desalinated or the aqueous solution from which water is desired to be extracted acquires a curved liquid-gas interface throughout its extension, that is, it forms menisci 18 within the microgrooves that cover, at least in part, the evaporating surface of the latent heat exchanger tubes or chambers.

The water vapor supplied to the condensation chamber condenses and acquires a curved liquid-gas interface throughout its extension, that is, it forms menisci 19 of water within the microgrooves or another capillary structure that covers, at least in part, the condensing surface of the tubes or chambers of the latent heat exchanger;

The latent heat released in the vapor condensation process is absorbed by the evaporation process passing through a path 20 free of water layers. A water layer has a low thermal energy transfer coefficient. The absence of thermally insulating water layers along the path 20 allows a high latent heat transfer coefficient and permits the temperature differential between the liquid to be evaporated on the evaporating surface 18 and the temperature of the condensed vapor on the condensing surface 19 to be very low. It is to be noted that an evaporation and condensation cycle can be obtained from gradients between the primary saturated vapor and the secondary saturated vapor of 10 Pa for low salinity aqueous solutions and from 40 Pa for seawater with a salinity of 35 g/kg and temperature around 20° C.;

The latent heat of condensation is 100% recycled and transformed into latent heat of evaporation. The primary vapor is generated on the evaporating surface of the latent heat exchanger. The evaporation process is explosive in the sense that the volume of the vapor generated is around 33,000 times greater than the volume of the liquid water evaporated and under vacuum conditions, without incondensable gases, the speed of this expansion is only limited by the sonic limit for water vapor at its temperature.

The secondary vapor condenses on the condensing surface of the latent heat exchanger. The condensation process is implosive in the sense that the volume of the vapor is around 33,000 times greater than the volume of liquid water resulting from the condensation and, under vacuum conditions, without incondensable gases, the speed of this implosion is only limited by the sonic limit for water vapor at its temperature.

In the absence of barriers, and as long as there is a temperature gradient between the secondary vapor that condenses on the condensing surface of the latent heat exchanger and the aqueous solution to be evaporated on the evaporating surface, the sonic velocity is the speed limit of the vapor flow that flows from the evaporative explosion zone to the condensing implosion zone. Current primary vapor compression devices place barriers in the flow of the vapor flowing from the evaporating surface to the condensing surface, such as the blades of a fan or blower, the chambers of a compressor or the water cone of an injector. These barriers strongly reduce the speed of the secondary vapor flow and limit the vapor flow rate, that is, the desalination capacity of the current devices and limit their energy efficiency. The device for desalination by liquid water jet compression leaves a barrier-free open path for vapor to flow from the evaporating surface to the condensing surface or uses a water vapor flow expansion chamber to achieve a reduction of the velocity of the water vapor flow below the droplet velocity of the at least one liquid water jet.

As shown in FIG. 1, the device for desalination by liquid water jet compression is based on the input of translational kinetic energy and has a lateral opening free of obstacles to the vapor jet; it also includes:

At least one liquid water pressure pump 13 that provides pressurized water to at least one nozzle 7 that generates a liquid water jet 8 with the direction of the vapor flow having the speed and dispersion of small droplets necessary to entrain part of the primary vapor 5 and supply speed to it, creating a liquid water-vapor two-phase flow 17 inside a vapor acceleration duct 9;

At least one duct that leads a flow of pressurized water 14 from the pressure pump 13 to at least one pressure nozzle 7 placed inside the collection chamber 6 or inside at least one vapor acceleration duct 9;

At least one vapor acceleration duct 9 into which the at least one nozzle 7 throws a liquid water jet 8 in the direction of the vapor flow;

The at least one pressure nozzle 7 forms a liquid water jet 8 that entrains and supplies speed to at least part of the primary water vapor 5, resulting in a two-phase mixture 17 containing liquid water from the jet 8 and the entrained water vapor;

The vapor acceleration duct 9 is inside a duct 21 that surrounds it, so that the primary vapor 5 can enter inside the acceleration duct 9 through at least one inlet side port 22 with an obstacle-free path for a water vapor stream;

At least one diffuser and phase separation chamber 10 to which the two-phase mixture 17 arrives, so that the kinetic energy contained in the two-phase mixture 17 in the form of speed is converted, in part, into potential energy in the form of pressure energy in the vapor, resulting in a secondary saturated vapor 16 with a higher pressure and temperature than the primary saturated vapor 5. Since this increase in pressure and temperature of the secondary vapor occurs in the presence of a mist of water droplets in liquid phase, no superheating of the vapor occurs. This, at least one, diffuser and phase separation chamber 10 can also have the function of a demister and, after the loss of speed of the two-phase mixture 17, the liquid splashes or droplets are retained in a demisting mesh, defogger, 15 or water droplet retention barriers. This demisting mesh may not be necessary depending on the geometry of the diffuser and phase separation chamber 10. A diffuser and phase separation chamber 10 comprises at least one secondary vapor outlet duct 16 to the condensation chamber 11, and at least one liquid water evacuation duct 12, through which the rest of the liquid water supplied with the liquid water jet 8 is extracted;

A condensation chamber 11 to which the secondary saturated water vapor 16 arrives. In the condensing chamber 11, there is the external condensing surface of the tubes or chambers 1 of the high efficiency latent heat exchanger, the secondary saturated water vapor 16 being condensed on this condensing surface. The secondary saturated water vapor 16 has a temperature and pressure higher than those of the primary vapor 5, the pressure increase depending on the pressure of the primary saturated vapor 5.

Figure 3:
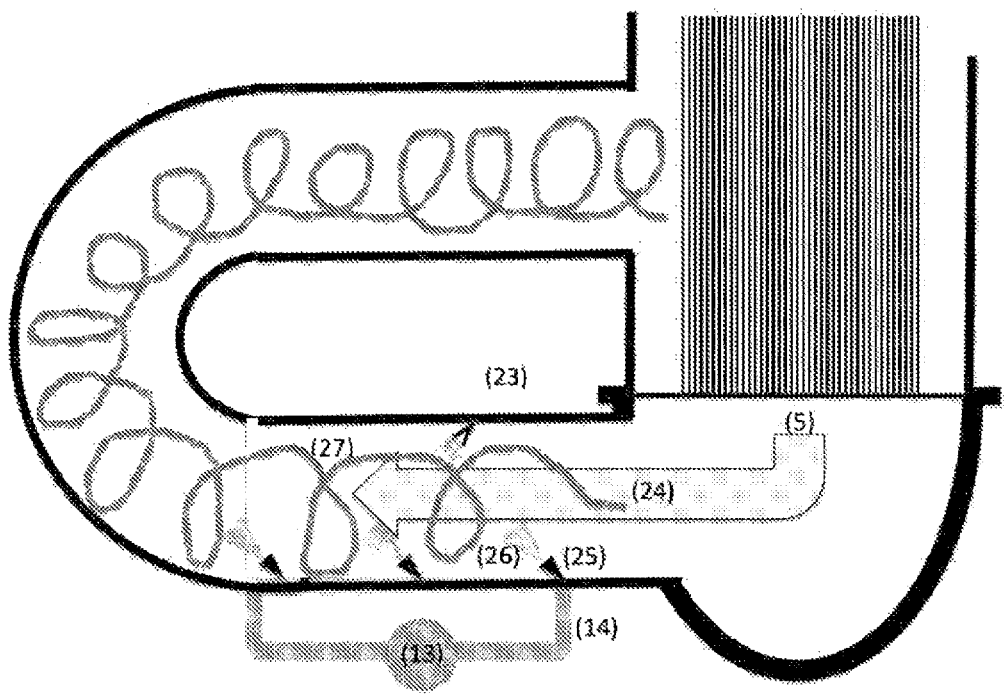
FIG. 3 shows a diagram of a configuration of the device for desalination by liquid water jet compression with input of rotational kinetic energy.

As shown in FIG. 3, the device for desalination by liquid water jet compression is based on rotational kinetic energy input, it also includes:

At least one water pressure pump 13 that, through at least one pressure duct 14, feeds at least one pressure nozzle 25 that produces a liquid water jet tangential 26 to the flow of vapor 5 that flows from the evaporating surface to the condensing surface inside a duct 23 for supplying rotational kinetic energy;

The at least one tangential liquid water jet 26 is a jet with a pressure, flow rate and direction that keeps the central part of the water vapor flow 24 free of water droplets and generates a rotational, helical movement of the vapor flow 27 with an internal path 24 free of water droplets. The centrifugal forces of the vapor flow 27 promote the separation of the higher density fluids towards the outside of the rotational, helical flow, contributing to the absence of obstacles in the middle and central part 24 of the helical flow 27 through which the vapor flow that receives the kinetic energy of rotation circulates without obstacles;

The vapor flow 27 is charged with the rotational energy that it receives from the tangential jets 26 and this rotational energy is progressively transformed into greater potential energy of the water vapor, generating a secondary vapor with a higher temperature and pressure than the primary vapor. Since this transformation of energy occurs in the presence of droplets of water, the vapor remains saturated and phenomena of vapor overheating are not seen;

At least one tangential liquid water jet 26 can be added through at least one tangential inlet of primary vapor driven by a fan or blower that provides more rotational kinetic energy to the helical flow 27.

Figure 4:
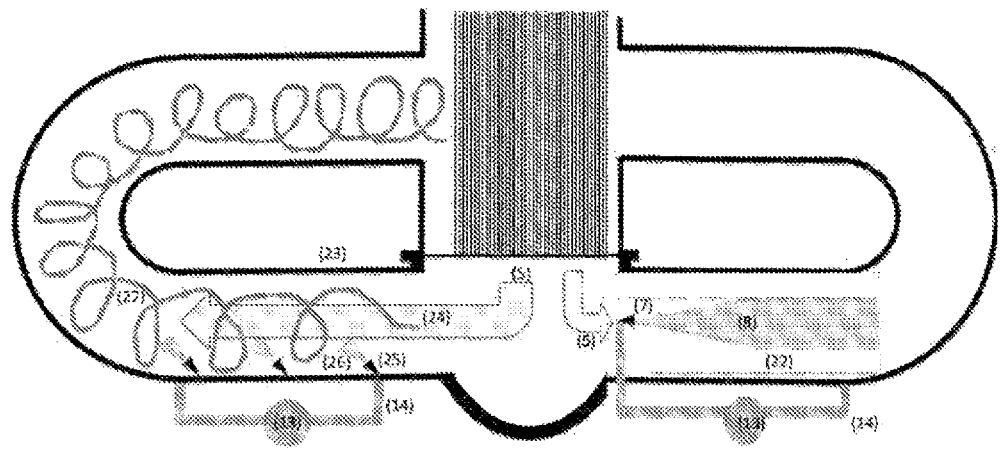
FIG. 4 shows a diagram of a configuration of the device for desalination by liquid water jet compression with input of translational kinetic energy and with input of rotational kinetic energy.

As shown in FIG. 4, the device for desalination by liquid water jet compression is based on the combination of translational kinetic energy input and rotational kinetic energy input, it also includes:

At least one injector fed by at least one pressure pump 13 that feeds at least one nozzle 7 that produces at least one water flow 8 axial to the vapor flow inside at least one acceleration duct 9 that can have lateral openings 22 or not have these openings since the device for desalination by liquid water jet compression in this configuration has a barrier-free vapor flow through at least one second duct 23 through which a helical flow 27 flows. This axial flow of water 8 allows the desalination device to be started by compressing the liquid water jet with ease, quickly creating a controlled pressure and temperature gradient between the primary vapor 5 and the secondary vapor, although the flow management capacity through this at least one liquid water jet 8 in the direction of vapor flow is limited by the barrier imposed by the liquid water jet 8 itself to the flow of the primary vapor 5. This liquid water jet 8 in the direction of the vapor flow can be kept active during the desalination operating phase to ensure at all times a temperature gradient between the primary vapor 5 at the evaporator outlet and the secondary vapor on the condensing surface;

At least one duct for supplying rotational kinetic energy 23 with at least one liquid water injector 25 that creates at least one liquid water jet 26 tangential to the primary vapor flow 5, generating a helical flow 27. The central part 24 of the helical flow 27 is free of water droplets in such a way that it offers a path 24 free of obstacles to the flow of vapor that flows from the evaporating surface to the condensing surface;

This configuration, combining at least one helical flow 27 and at least one axial flow 8, allows quick start-up, permits control over the temperature gradient during the operation and allows high vapor flow management by the helical flow 27 and the obstacle-free vapor path 24.

Figure 5:
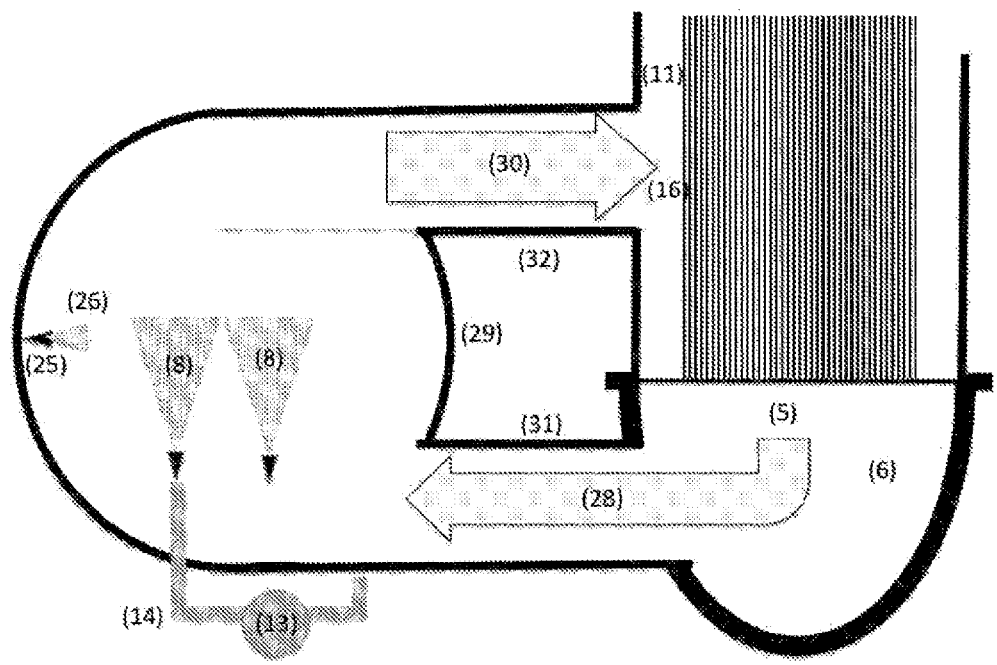
FIG. 5 shows a diagram of a configuration of the device for desalination by liquid water jet compression with a water vapor flow expansion chamber in which translational and rotational kinetic energy is supplied.

As shown in FIG. 5, the device for desalination by liquid water jet compression is based on the input of translational kinetic energy, input of rotational kinetic energy or both to the vapor flow inside a vapor flow expansion chamber. It also includes:

At least one vapor flow expansion chamber 29, which has a cross section greater than the cross section of at least one primary vapor outlet tube 31 of the collection chamber 6 and greater than the cross section of at least one secondary vapor inlet tube 32 to the condensation chamber, the cross section of the at least one primary vapor outlet tube 31 of the collection chamber being equal or similar to the cross section of the secondary vapor inlet tube 32 to the condensation chamber. The primary vapor 5 exits the collection chamber forming a high velocity vapor flow 28. When the vapor flow 28 reaches a larger cross section in the expansion chamber 29, its speed is reduced;

The design of the progressive increase in the cross section of the expansion chamber makes it possible to efficiently reduce the speed of the vapor flow until it reaches a speed lower than the speed of the drops of, at least, one pressurized liquid water jet 8 in the direction of the vapor flow to which it provides translational kinetic energy;

Inside the expansion chamber 29, rotational kinetic energy is provided to the vapor flow that flows at a lower speed and can better absorb the rotational kinetic energy with at least one pressurized water injector 25 placed tangentially to the vapor flow to throw a liquid water jet 26 tangential to the vapor flow to which it provides rotation;

Translational kinetic energy and rotational kinetic energy are provided inside the expansion chamber 29 to the vapor flow by combining at least one pressurized water jet 8 in the direction of the vapor flow and at least one pressurized water jet 26 tangential to the vapor flow;

The progressive reduction of the cross section of the expansion chamber 29 until it reaches the cross section of the secondary vapor inlet tube 32 to the evaporator chamber 11 allows the vapor flow to recover its high speed, giving rise to a secondary vapor flow 30 at high speed and the kinetic energy provided inside the expansion chamber is transformed into higher pressure and temperature of the secondary saturated water vapor 16.

The aqueous solution to be desalted or purified 3 can be desalted or purified at its room temperature. The device for desalination by liquid water jet compression does not require a minimum working temperature.

Given the small pressure differential required between the primary saturated water vapor of the evaporating surface 5 and the secondary saturated vapor of the condensing surface 16, the device for desalination by liquid water jet compression can obtain this small pressure differential through the system of rotational kinetic energy input described and can start and maintain the temperature gradient in a highly controlled manner with the system of translational kinetic energy input described. In this way, the main work input to the system is in the form of pressurized water by means of a water pump and in a complementary way pressurized vapor can also be provided by means of a fan or blower.

The desalination by liquid water jet compression makes it possible to desalinate seawater or extract water from other aqueous solutions with a low specific energy consumption, around 0.5 kWh/m$^3$ above the specific work imposed by the elevation of the boiling point depending on the salinity of the solution to be desalinated or purified. This low specific consumption, added to the low toxicity of the brine returned to the environment, opens the door to a truly sustainable high-capacity desalination system.

LIST OF NUMERICAL REFERENCES (1)—Latent heat exchanger tubes or chambers
(2)—Shell
(3)—Input of aqueous solution or seawater to be desalinated or purified
(4)—Lower part of the tubes or chambers, brine and evaporated water vapor outlet
(5)—Primary saturated water vapor
(6)—Collection chamber (7)—Pressurized water nozzle
(8)—Liquid water jet
(9)—Vapor acceleration duct
(10)—Diffuser and phase separation chamber
(11)—Condensation chamber
(12)—Outlet duct, evacuation of liquid water
(13)—Water pressure pump
(14)—Pressurized water flow
(15)—Demisting device
(16)—Secondary saturated water vapor
(17)—Mixture of two phases of liquid water and entrained vapor
(18)—Evaporating surface meniscus
(19)—Condensing surface meniscus
(20)—Thermal energy path
(21)—Chamber surrounding the vapor acceleration duct
(22)—Primary vapor inlet side port in the vapor acceleration duct
(23)—Rotational kinetic energy supply tube
(24)—Vapor path, free of obstacles in the central part of the helical flow
(25)—Tangential pressurized water nozzle
(26)—Tangential pressurized water flow
(27)—Helical vapor flow
(28)—High speed primary vapor flow
(29)—Expansion chamber
(30)—High speed secondary vapor flow
(31)—Primary vapor outlet tube from the collection chamber
(32)—Secondary vapor inlet tube to the condensation chamber

What is claimed is:

1. A desalination device comprising:
a latent heat exchanger housed within a shell, the latent heat exchanger having:
an inlet for seawater or an aqueous solution;
an evaporation chamber having an evaporating surface;
a condensation chamber having a condensing surface;
at least one primary water vapor outlet;
at least one secondary water vapor inlet; and
at least one vapor path connecting the evaporating surface by the at least one primary water vapor outlet to the condensing surface by the at least one secondary water vapor inlet; and
a liquid water pressure pump that provides pressurized water flow to a pressure nozzle configured to produce a liquid water jet into the primary water vapor in the at least one vapor path, inputting kinetic energy to the primary water vapor and causing a rise in the temperature and pressure thereof to form the secondary water vapor.

2. The desalination device according to claim 1, wherein:
the latent heat exchanger is a latent heat exchanger of tubes, wherein the inside of the tubes corresponds to the evaporation chamber and the area outside of the tubes within the shell corresponds to the condensation chamber;
the evaporating surface of the tubes inside the evaporation chamber is covered with microgrooves in which the seawater or the aqueous solution forms menisci and the primary water vapor evaporates from the evaporating surface of the tubes;
the secondary water vapor is supplied to the condensing surface of the tubes inside the condensation chamber and the secondary water vapor condenses forming menisci within microgrooves or other capillary structure covering the condensing surface of the tubes; and
a thermal energy path between latent heat released on the condensing surface of the tubes and latent heat absorbed on the evaporating surface of the tubes is free of water layers.

3. The desalination device according to claim 2, wherein:
the pressure nozzle by producing the liquid water jet from the pressurized water flow converts potential energy in the form of pressure to translational kinetic energy in the form of velocity to propel the primary water vapor into at least one vapor acceleration duct, thereby creating a two-phase mixture of liquid water and entrained vapor, the pressure nozzle is located inside the at least one vapor acceleration duct; and
the at least one vapor acceleration duct is inside a chamber to which the primary water vapor has access and has at least one inlet side port through which the primary water vapor can access inside the vapor acceleration duct without obstacles; and
the latent heat exchanger further has at least one diffuser and phase separation chamber where the transformation of kinetic energy is completed in the form of velocity of the two-phase mixture, in potential energy in the form of an increase in water vapor pressure, generating the secondary water vapor, wherein the diffuser and phase separation chamber has at least one secondary vapor outlet that is supplied to the condensation chamber where it condenses on the condensing surface of the condensation chamber.

4. The desalination device according to claim 2, wherein:
the latent heat exchanger further has a collection chamber, the collection chamber includes at least one primary vapor outlet tube having a cross section equal to a cross section of at least one secondary vapor inlet tube to the condensation chamber;
the latent heat exchanger further has at least one expansion chamber with a cross section greater than the at least one primary vapor outlet tube from the collection chamber and with a cross section greater than the at least one secondary vapor inlet tube to the condensation chamber and inside the expansion chamber the speed of the primary water vapor flow is reduced; and
the latent heat exchanger further has at least one pressurized water injector that generates at least one pressurized water jet in the direction of the vapor flow with drops that have a speed greater than the speed of the vapor flow, to which it supplies translational kinetic energy.

5. The desalination device according to claim 4, further comprising at least one pressurized water injector that generates at least one pressurized water jet tangential to the vapor flow, to which it supplies rotation and provides rotational kinetic energy.

6. The desalination device according to claim 2, wherein:
the latent heat exchanger further has a collection chamber, the collection chamber includes at least one primary vapor outlet tube having a cross section equal to a cross section of at least one secondary vapor inlet tube to the condensation chamber;
the latent heat exchanger further has at least one expansion chamber with a cross section greater than the at least one primary vapor outlet tube from the collection chamber and with a cross section greater than the at least one secondary vapor inlet tube to the condensation chamber and inside the expansion chamber the speed of the primary water vapor flow is reduced; and
the latent heat exchanger further has at least one pressurized water injector that generates at least one pressurized water jet tangential to the vapor flow, to which it supplies rotation and provides rotational kinetic energy.

\* \* \* \* \*